(12) United States Patent
Wu

(10) Patent No.: US 8,403,555 B2
(45) Date of Patent: Mar. 26, 2013

(54) HIGH-SPEED BLENDING, HEATING AND TEMPERATURE SENSING STRUCTURE OF ELECTRIC BLENDER

(75) Inventor: Andy Wu, Fujian (CN)

(73) Assignee: Quanzhou Yida Home Appliance Industry Co., Ltd., Fujian (CN)

( * ) Notice: Subject to any disclaimer, the term of this patent is extended or adjusted under 35 U.S.C. 154(b) by 249 days.

(21) Appl. No.: 13/028,277

(22) Filed: Feb. 16, 2011

(65) Prior Publication Data
US 2012/0205475 A1 Aug. 16, 2012

(51) Int. Cl.
*A47J 43/046* (2006.01)
(52) U.S. Cl. .......................... 366/205; 366/146
(58) Field of Classification Search .......... 366/144–146, 366/197–207, 314, 331; 99/348, 453; 220/304; 241/282.1–282.2, 101.3
See application file for complete search history.

(56) References Cited

U.S. PATENT DOCUMENTS

| | | | | | |
|---|---|---|---|---|---|
| 2,282,866 | A | * | 5/1942 | Hagen | 366/205 |
| 6,283,625 | B2 | * | 9/2001 | Frankel et al. | 366/146 |
| 6,318,247 | B1 | * | 11/2001 | Di Nunzio et al. | 99/348 |
| 7,270,156 | B2 | * | 9/2007 | Beesley et al. | 141/82 |
| 7,780,337 | B2 | * | 8/2010 | Peng | 366/144 |
| 7,878,702 | B2 | * | 2/2011 | Peng | 366/145 |
| 7,997,786 | B2 | * | 8/2011 | Liu | 366/44 |
| 2006/0286255 | A1 | * | 12/2006 | Xu et al. | 426/589 |
| 2008/0198688 | A1 | * | 8/2008 | Peng | 366/145 |
| 2008/0264927 | A1 | * | 10/2008 | Peng | 219/452.11 |
| 2009/0260523 | A1 | * | 10/2009 | Peng | 99/348 |
| 2010/0018982 | A1 | * | 1/2010 | Liu | 220/592.17 |
| 2011/0232506 | A1 | * | 9/2011 | Cai | 99/484 |
| 2012/0205475 | A1 | * | 8/2012 | Wu | 241/101.3 |

FOREIGN PATENT DOCUMENTS
EP 1647217 A1 * 4/2006

* cited by examiner

*Primary Examiner* — Charles E Cooley
(74) *Attorney, Agent, or Firm* — Alan Kamrath; Kamrath & IP Lawfirm, P.A.

(57) ABSTRACT

The present invention provides a high-speed blending, heating and temperature sensing structure of an electric blender. The blender includes a temperature transducer installed at the bottom of a mixing cup, and the temperature transducer has a temperature sensing head extended into the mixing cup and an upper connector coupled to the bottom of the temperature transducer and installed at the bottom of the mixing cup, and a temperature sensing signal is coupled between the temperature sensing head and the upper connector. A hidden temperature sensing connector seat is disposed at the top of the base and has a lower connector corresponding to the upper connector at the bottom of the mixing cup, and both upper and lower connectors are coupled with each other when the mixing cup and the base are combined, and the lower connector is coupled to a display screen and a touch control switch on the base through a signal line. Therefore, the temperature of a food material in the mixing cup of the blender mixing cup can be displayed on the display screen by coupling the upper and lower connectors, and the touch control switch is provided for setting the temperature of heating the food material in the mixing cup.

4 Claims, 6 Drawing Sheets

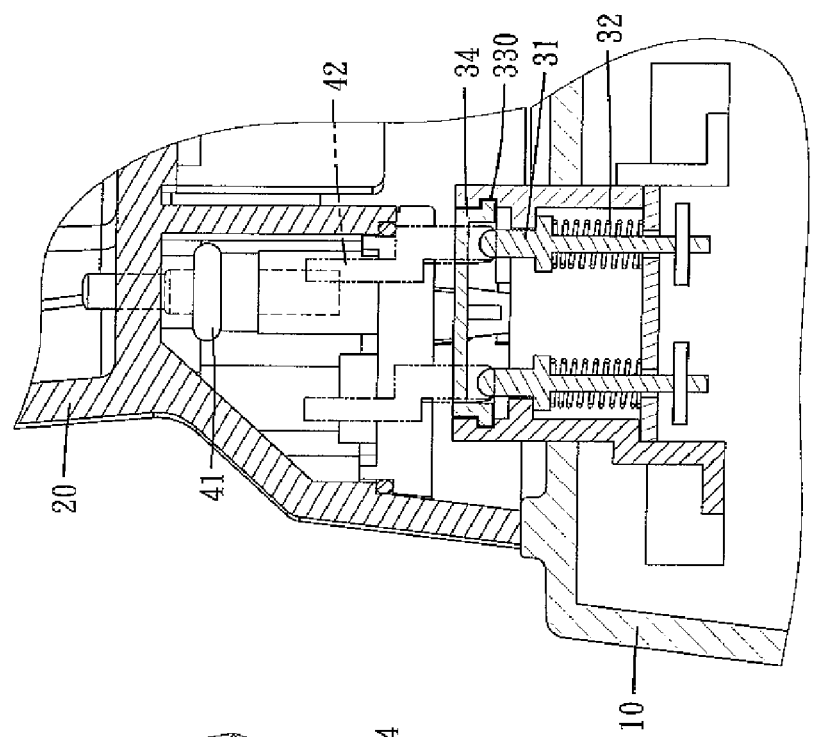
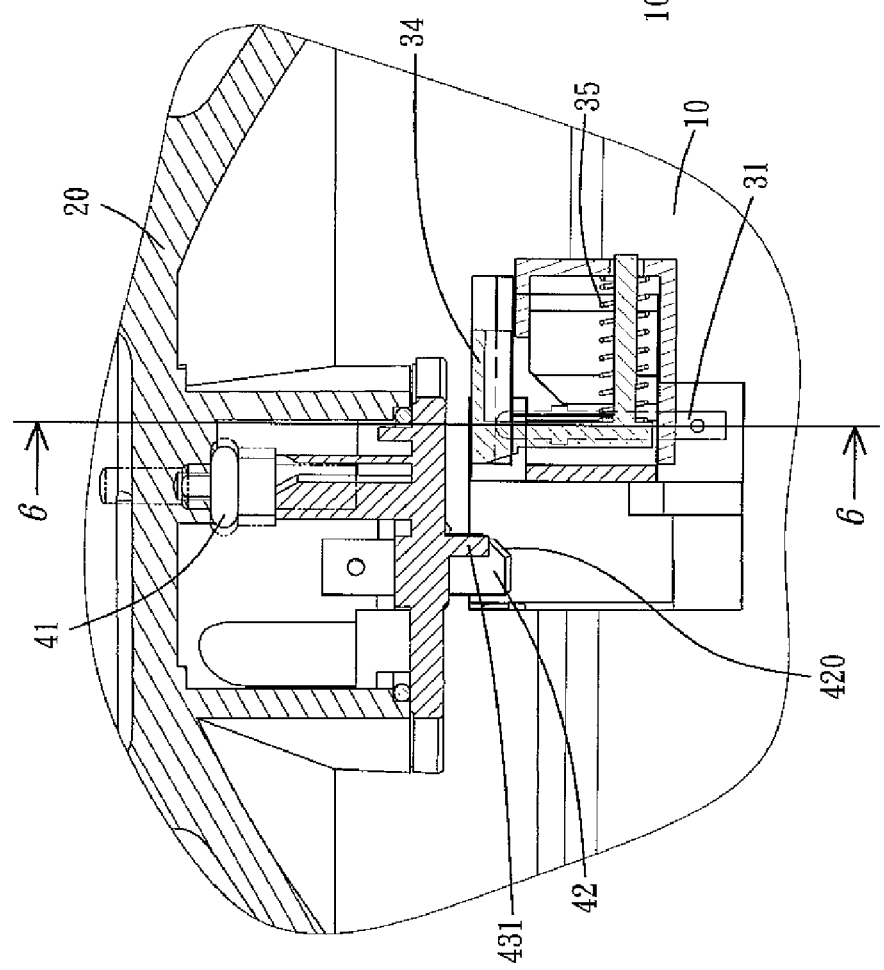
FIG. 5
FIG. 6

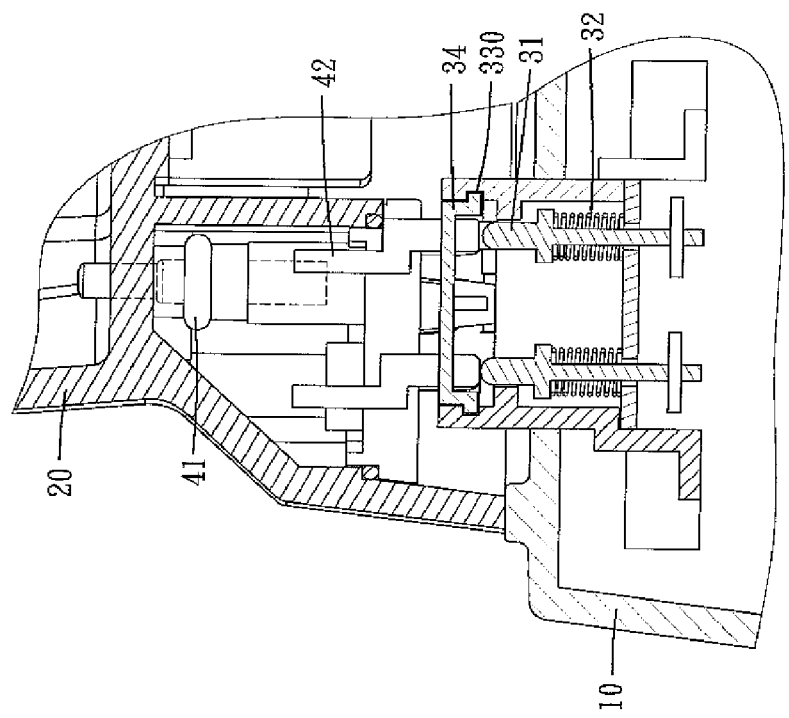
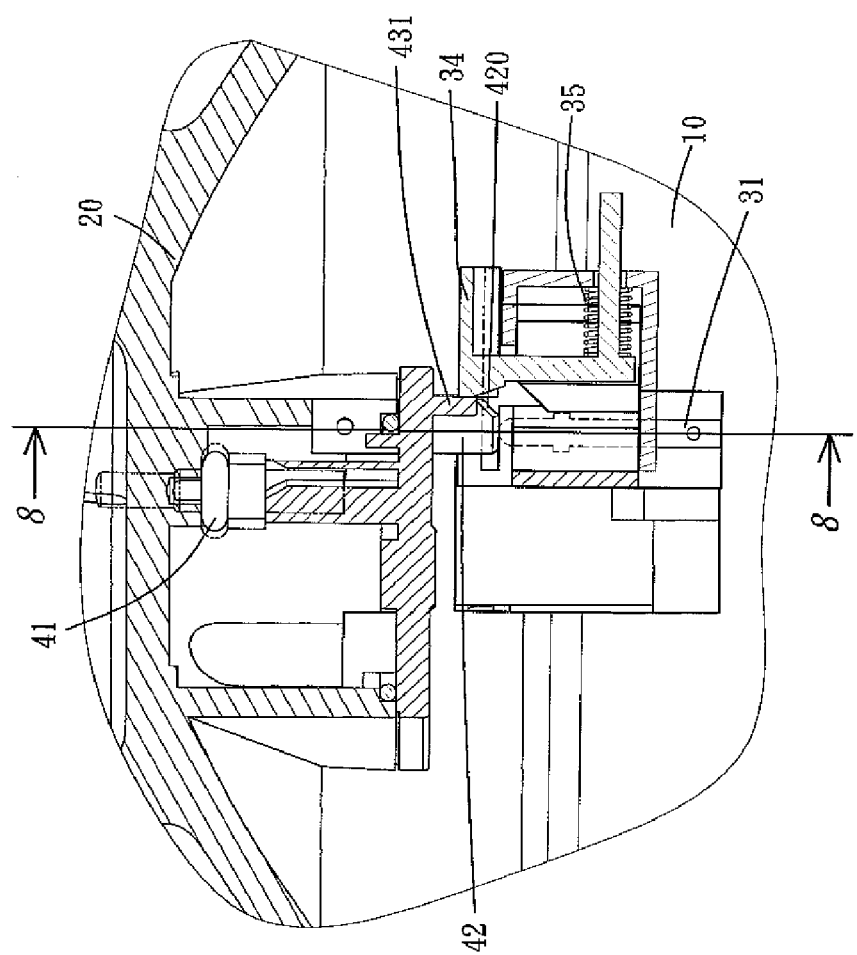

HIGH-SPEED BLENDING, HEATING AND TEMPERATURE SENSING STRUCTURE OF ELECTRIC BLENDER

BACKGROUND OF THE INVENTION

1. Field of the Invention

The present invention relates to an electric blender, and more particularly to an electric blender capable of displaying the temperature through heat conduction at the connecting position of a temperature transducer installed at the bottom of the mixing cup and a temperature sensing connector seat installed at the top of the base, and setting the temperature to heat a food material in a mixing cup while the food material in mixing cup is blended and heated at a high speed.

2. Description of the Related Art

As a conventional electric blender used for heating the food material in the mixing cup is divided into two main types: the first type is to install a heating device at the bottom of the mixing cup, and the second type is to increase the rotating speed of the electric blender in order to heat the blended food material by the high speed. In the related industry, there is an urgent need for manufacturers to improve the way of heating the food material in the mixing cup at high speed and transmit the temperature inside the mixing cup to the display screen of the base in order to control the temperature. The present invention aims at the aforementioned need to improve the way of transmitting the temperature inside the mixing cup to the display screen of the base to display the temperature and controlling the temperature of heating the food material in the mixing cup.

SUMMARY OF THE INVENTION

Therefore, it is a primary objective of the present invention to provide a high-speed blending, heating and temperature sensing structure of an electric blender capable of conducting the temperature inside the mixing cup to the base to display the temperature and setting the temperature of heating the food material in the mixing cup by a touch control switch. The present invention is characterized in that a temperature transducer is installed at the bottom of the mixing cup of the blender, and the temperature transducer includes a temperature sensing head extended into the mixing cup, and an upper connector is coupled to the bottom of the temperature transducer and disposed at the bottom of the mixing cup, and a temperature sensing signal is coupled between the temperature sensing head and the upper connector. A hidden temperature sensing connector seat is disposed at the top of the base, and the temperature sensing connector seat has a lower connector corresponding to the upper connector at the bottom of the mixing cup, and both upper and lower connectors are coupled with each other when the mixing cup is combined with the base, and the lower connector is coupled to the display screen and the touch control switch on the base through a signal line. With such installation, the temperature of the food material in the blender mixing cup can be displayed on the display screen by means of the connection of the upper and lower connectors, such that the temperature of heating the food material in the mixing cup can be set by the touch control switch.

BRIEF DESCRIPTION OF THE DRAWINGS

FIG. 5 is a cross-sectional view of a preferred embodiment of the present invention, before a mixing cup and a base are combined;

FIG. 6 is a cross-sectional view of Section 6-6 of FIG. 5;

FIG. 7 is a cross-sectional view of a preferred embodiment of the present invention, after a mixing cup and a base are combined; and FIG. 8 is a cross-sectional view of Section 8-8 of FIG. 7.

DETAILED DESCRIPTION OF THE PREFERRED EMBODIMENTS

Figure 1:
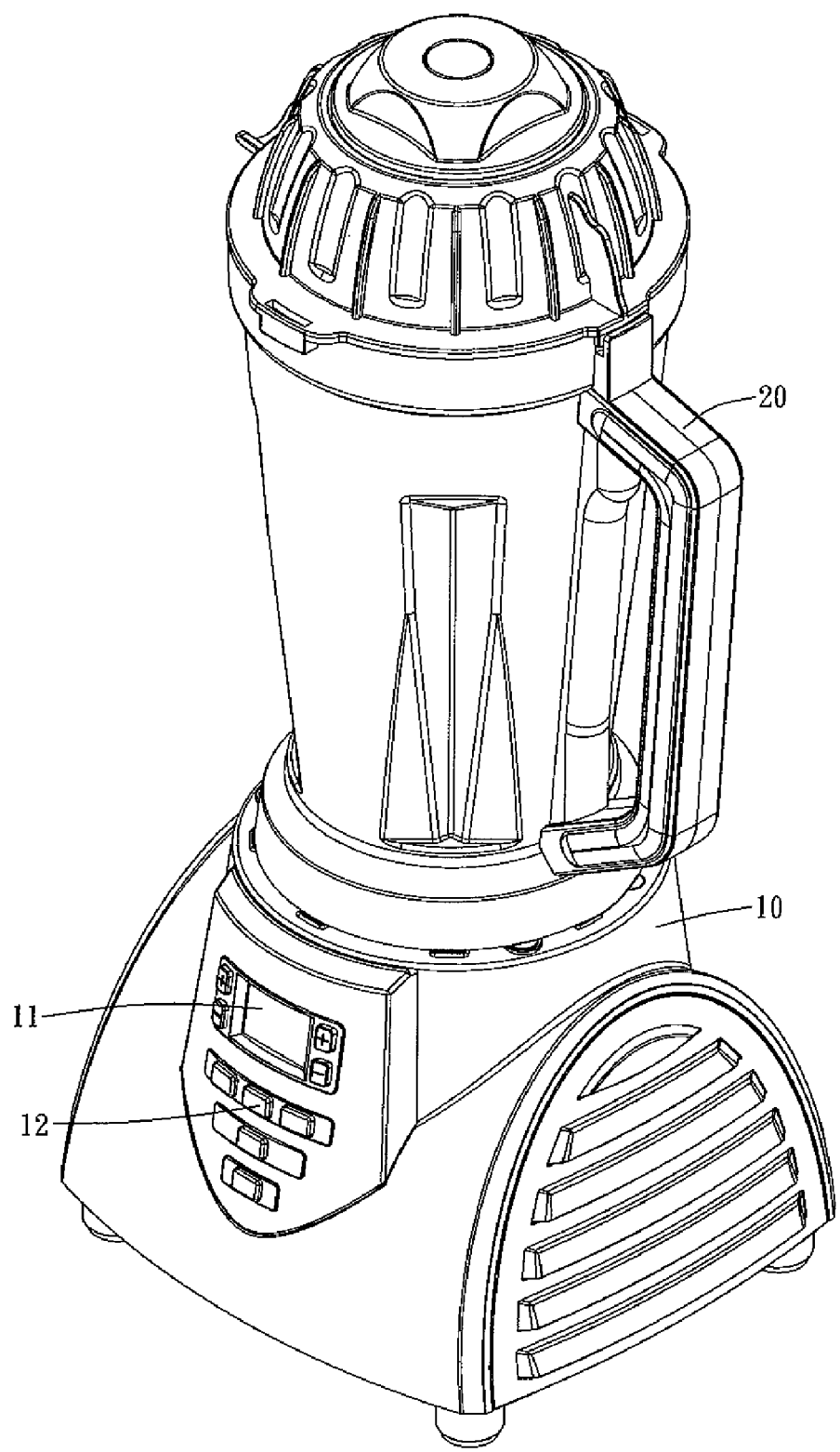
FIG. 1 is a perspective view of a preferred embodiment of the present invention.
Figure 2:
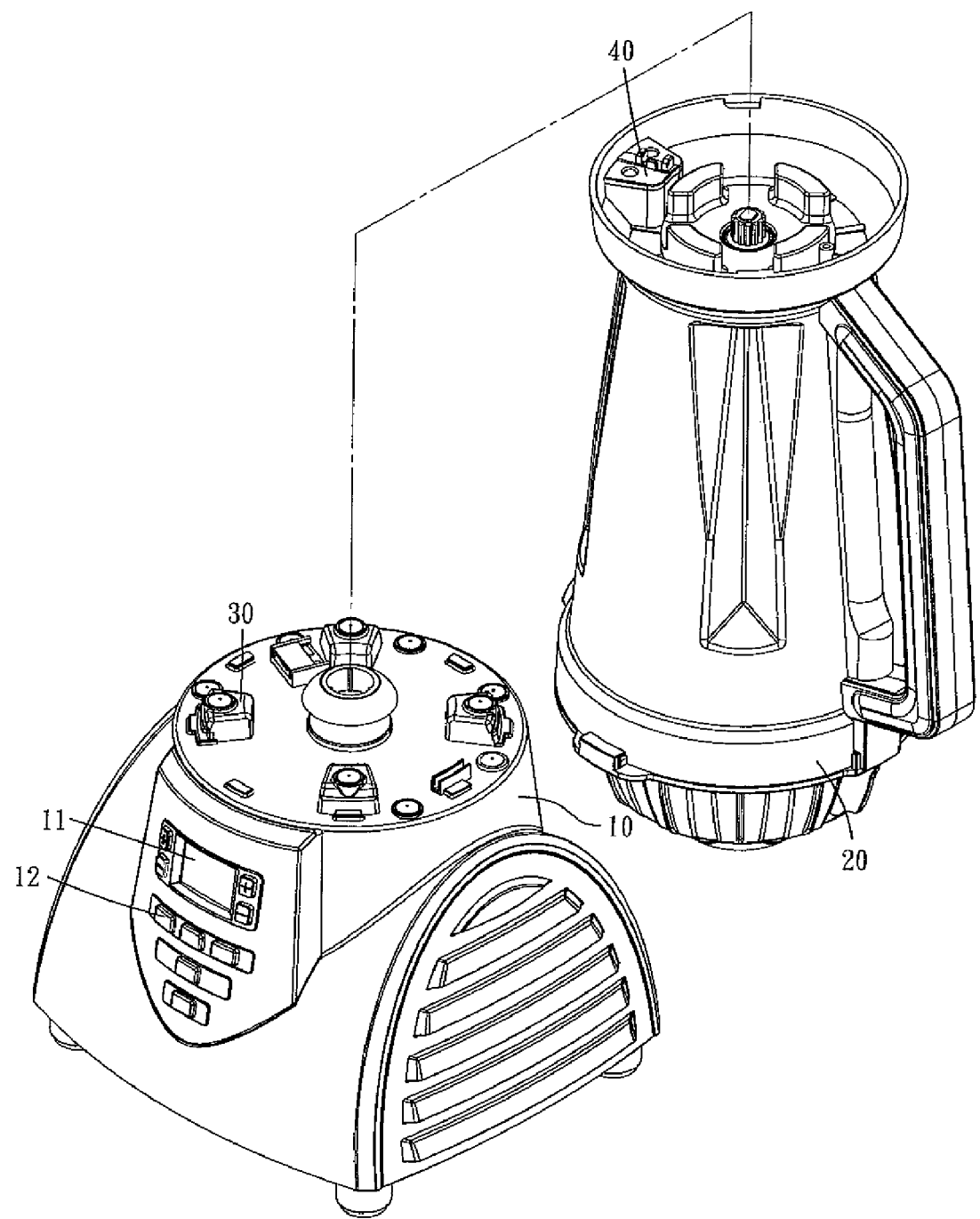
FIG. 2 is an exploded view of a preferred embodiment of the present invention.
Figure 3:
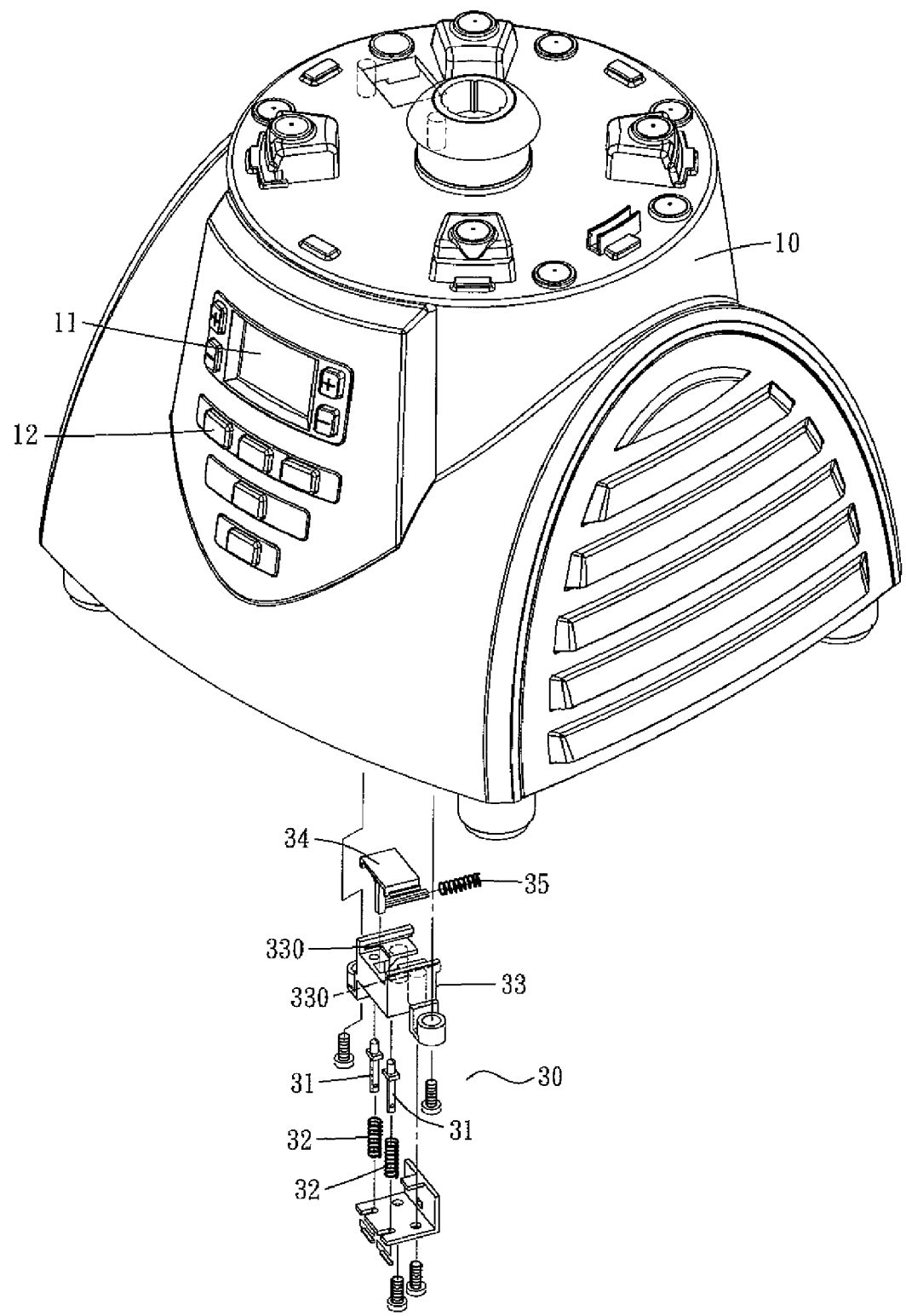
FIG. 3 is an exploded view of a base in accordance with a preferred embodiment of the present invention.

To make it easier for our examiner to understand the technical characteristics and measures of the present invention to achieve the aforementioned objects and effects, we use preferred embodiments with related drawings for the detailed description of the present invention as follows. With reference to FIGS. 1 to 4 for an electric blender of the present inventions, the electric blender comprises a base 10 and a mixing cup 20 installed at the top of the base 10, wherein a driving motor is installed in the base 10 for driving and rotating a high-speed knife installed in the mixing cup 20, and a display screen 11 and a touch control switch 12 are installed at the front side of the base 10. The present invention is characterized in that the base 10 (as shown in FIGS. 2 and 3) includes a hidden temperature sensing connector seat 30 disposed at the top of the base 10, and the temperature sensing connector seat 30 includes a lower connector 31 (as shown in FIGS. 5 and 6), and a spring 32 is passed through the bottom of the lower connector 31 for elastically supporting the lower connector 31 upward. The bottom of the lower connector 31 is coupled to power circuits of the display screen 11 and the touch control switch 12 of the base 10 by a signal line. The lower connector 31 is limited within a fixing seat 33, wherein the fixing seat 33 has a notch formed at the top of the fixing seat 33, and a slide cover 34 is embedded into inwardly concave slide rails 330 which are disposed on both internal sidewalls of the notch respectively for covering and hiding the top of the lower connector 31. The slide cover 34 is pushed by another spring 35, such that the slide cover 34 can be maintained in the condition of covering and hiding the top of the lower connector 31 (as shown in FIGS. 5 and 6).

Figure 4:
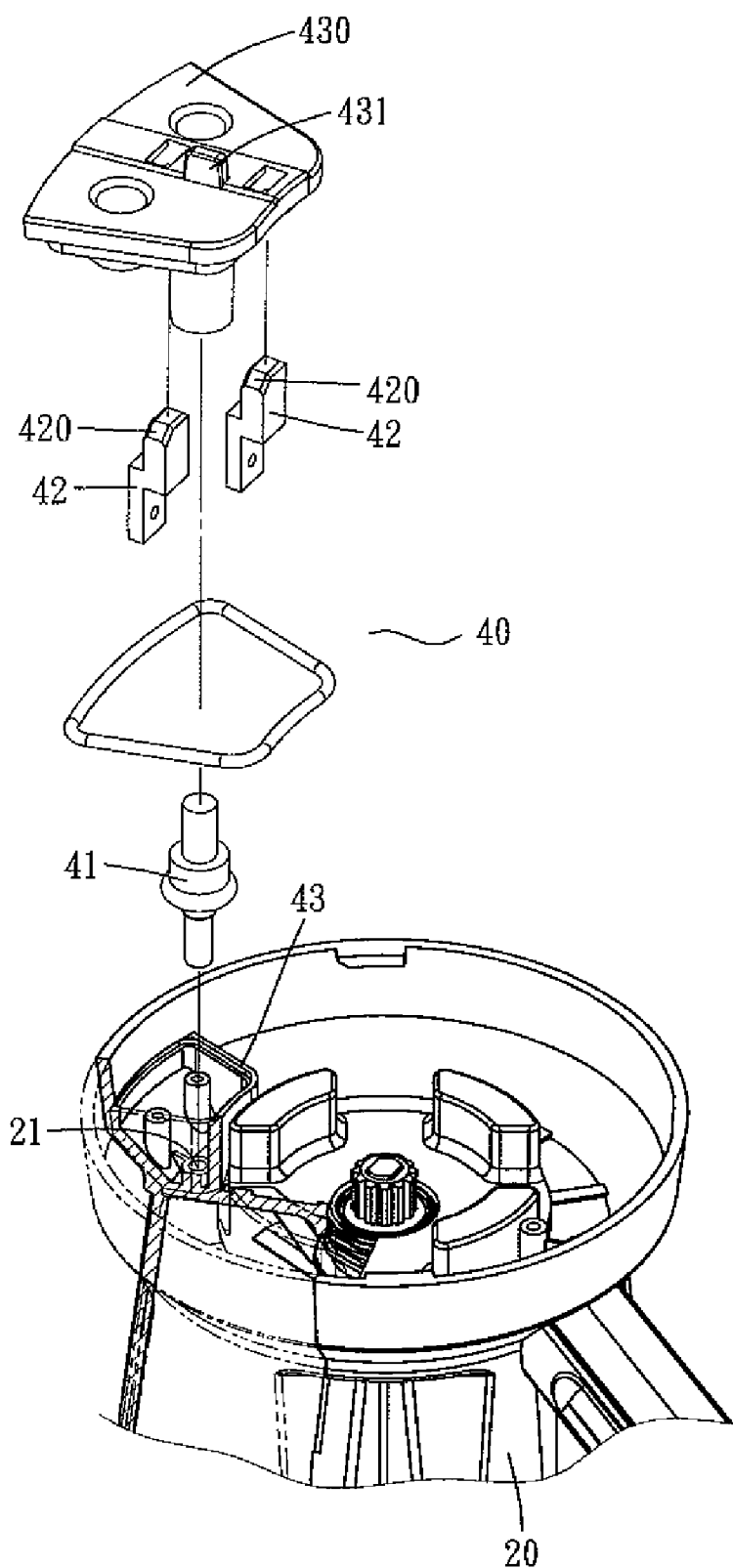
FIG. 4 is an exploded view of a mixing cup in accordance with a preferred embodiment of the present invention.

In FIGS. 2 and 4, a temperature transducer 40 is installed at the bottom of the mixing cup 20. The temperature transducer 40 includes a temperature sensing head 41, and the top of the temperature sensing head 41 is passed into the mixing cup 20 through a through hole 21 that is formed at the bottom of the mixing cup 20 for examining the temperature inside the mixing cup, and then the through hole 21 is sealed. The temperature transducer 40 further includes an upper connector 42 having a temperature sensing signal coupled to the temperature sensing head 41 and extended downward and installed corresponding to the lower connector 31 of the base 10, and the upper connector 42 is limited within a fixed chamber 43, and the bottom of the upper connector 42 is extended out from the bottom of the bottom cover 430 of the fixed chamber 43, and the bottom of the upper connector 42 has a taper surface 420 disposed towards the lower connector 31. The bottom cover 430 has a shifting paddle 431 protruded downwardly from the upper connector 42 and disposed at a position proximate to the slide cover 34 of the base 10, such that when the mixing cup 20 is rotated to combine with the base 10 and positioned at a fixed position, the shifting paddle 431 can push the slide cover 34 horizontally to compress and displace the spring 35 to expose the lower connector 31 installed at the top of the base 10. After the foregoing components are assembled sequentially, the mixing cup 20 is mounted onto the base 10 as shown in FIGS. 5 and 6. Now, the slide cover 34 of the temperature sensing connector seat 30 disposed at the top of the base 10 covers and hides the lower connector 31. Before the mixing cup 20 is rotated and positioned at a fixed position, the shifting paddle 431 of the mixing cup 20 pushes the slide cover 34 horizontally to compress and displace the spring 35 to expose the lower connector 31. If the mixing cup 20 is rotated continuously to the positioning position of the base 10, the taper surface 420 at the bottom of the upper connector 42 will hit the top of the lower connector 31, such that the lower connector 31 will compress the spring 32 to move downward, and the upper and lower connectors 42, 31 will be contacted closely in the vertical direction to constitute a signal connection (as shown in FIGS. 7 and 8). Therefore, data of the temperature of the food material in the mixing cup can be transmitted through the temperature sensing head 41, the upper connector 42, the lower connector 31, and the signal line to the display screen 11. Similarly, users can use the power circuit and the touch control switch 12 to set the temperature of heating the food material in the mixing cup 20. If the temperature reaches the set value, the electric blender will stop its blending and heating procedures.

In summation of the description above, the present invention can achieve the effects of measuring and setting the temperature of the food material in the mixing cup when the electric blender is used for blending and heating the food material at a high speed, and the present invention as disclosed in the preferred embodiments are novel and it achieves the expected objectives and effects and complies with the patent application requirements, and thus is duly applied for patent application.

What is claimed is:

1. A high-speed blending, heating and temperature sensing structure of an electric blender, and the electric blender comprising a base and a mixing cup installed at the top of the base, and the base including a driving motor installed therein for driving a high-speed knife installed in the mixing cup, and a display screen and a touch control switch installed at a front side of the base, characterized in that a temperature transducer is installed at the bottom of the mixing cup of the blender, and the temperature transducer includes a temperature sensing head, and the top of the temperature sensing head is extended into the mixing cup, and the bottom of the temperature sensing head is coupled to an upper connector disposed at the bottom of the mixing cup, and a temperature sensing signal is coupled between the temperature sensing head and the upper connector, and a temperature sensing connector seat is disposed at the top of the base and includes a lower connector corresponding to the upper connector installed at the bottom of the mixing cup, and both upper and lower connectors are coupled with each other when the mixing cup is combined with the base, and the lower connector is coupled to power circuits of a display screen and a touch control switch installed on the base through a signal line.

2. The high-speed blending, heating and temperature sensing structure of an electric blender as recited in claim 1, wherein the temperature sensing connector seat disposed on the base is designed for hiding the lower connector and limiting the lower connector within a fixing seat, and the fixing seat has a notch formed at the top of the fixing seat, and a slide cover embedded into inwardly concave slide rails disposed on both internal sidewalls of the notch and provided for covering and hiding the top of the lower connector, and the slide cover is pushed laterally by another spring, such that the slide cover is maintained at a condition of covering and hiding the top of the lower connector, and the upper connector at the bottom of the mixing cup is limited within a fixed chamber, and the bottom of the mixing cup is extended out from the bottom of the bottom cover of the fixed chamber, and the bottom of the upper connector has a taper surface disposed towards the lower connector, and the bottom cover includes a shifting paddle protruded downwardly from the upper connector and at a position proximate to the slide cover of the base, such that the shifting paddle can push the slide cover horizontally to compress and displace the spring to expose the lower connector at the top of the base when the base is coupled and positioned at a fixed position by rotating the mixing cup.

3. The high-speed blending, heating and temperature sensing structure of an electric blender as recited in claim 2, wherein the bottom of the lower connector is sheathed with a spring, and the spring is provided for supporting the lower connector upward.

4. The high-speed blending, heating and temperature sensing structure of an electric blender as recited in claim 1, wherein a through hole is formed at the bottom of the mixing cup for passing the top of the temperature sensing head into the mixing cup to examine a temperature inside the mixing cup and then the through hole is sealed.

* * * * *